United States Patent [19]
Murphy

[11] Patent Number: 5,038,467

[45] Date of Patent: Aug. 13, 1991

[54] APPARATUS AND METHOD FOR INSTALLATION OF MULTI-PIN COMPONENTS ON CIRCUIT BOARDS

[75] Inventor: James V. Murphy, Warwick, R.I.

[73] Assignee: Advanced Interconnections Corporation, West Warwick, R.I.

[21] Appl. No.: 434,871

[22] Filed: Nov. 9, 1989

[51] Int. Cl.[5] ........................ B23P 19/00; H01R 9/00

[52] U.S. Cl. ........................................ 29/845; 29/741; 439/852; 439/152; 439/628

[58] Field of Search ........................ 29/845, 739, 741; 439/44, 45, 46, 74, 75, 152, 628, 851, 852, 853, 153, 159

[56] References Cited

U.S. PATENT DOCUMENTS

| | | | |
|---|---|---|---|
| 3,900,269 | 8/1975 | Anhalt et al. . | |
| 3,917,984 | 11/1975 | Kong et al. . | |
| 4,326,765 | 4/1982 | Brancaleone . | |
| 4,552,422 | 11/1985 | Bennett et al. . | |
| 4,557,540 | 12/1985 | Forbes et al. . | |
| 4,633,239 | 12/1986 | Nalbanti . | |
| 4,636,026 | 1/1987 | Coomey et al. . | |
| 4,652,065 | 3/1987 | Cassinelli . | |
| 4,674,811 | 6/1987 | Corwin . | |
| 4,675,007 | 6/1987 | Tragen . | |
| 4,707,052 | 11/1987 | Bouley . | |
| 4,813,881 | 3/1989 | Kirby | 439/74 |
| 4,892,492 | 1/1990 | Mueller | 439/852 |

FOREIGN PATENT DOCUMENTS

| | | | |
|---|---|---|---|
| 130719 | 1/1985 | European Pat. Off. | 439/75 |

OTHER PUBLICATIONS

Peter, A. E. and Pittwood, D. G., "Shielded Connectors," IBM Tech. Discl. Bull., vol. 22, No. 2 Jul. 1979, pp. 523–524.

Mele, P. J. and Uberbacher, E. C., "Straight-Through Connection," IBM Tech. Discl. Bull., vol. 13, No. 11, Apr. 1971, pp. 3341–3342.

Advanced Interconnections Product Catalog, vol. 6, pp. 15–17, 40–43.

Advanced Interconnections, Product Catalog, vol. 7, pp. 74–75.

Advanced Interconnections Product Catalog, vol. 8, p. 32.

Mill-Max Company's Product Advertisement (Spring 1989).

J. B. Cullinane, "Pin Grid Array Socket Total Forces", 22nd Annual Connector & Interconnection Technology Symposium, (1989).

Hypertronics Corporation Product Literature (KS Series).

*Primary Examiner*—P. W. Echols

*Attorney, Agent, or Firm*—Fish & Richardson

[57] ABSTRACT

An apparatus and method are disclosed for making connections between the pins of a multi-pin component and sockets mounted on a circuit board. A plurality of converter elements are installed between the component pins and sockets. Each converter element includes a receptor for mating with a pin of the multiple pin component. The receptor is sized to engage a pin having any diameter within a coarse range of diameters. Each converter element also includes a precision pin for mating with a socket on the circuit board. The diameter of the precision pin is held to a tolerance so that it is within a precision range of diameters. The variation in diameter within the precision range is less than the variation within the coarse range of diameters.

18 Claims, 7 Drawing Sheets

APPARATUS AND METHOD FOR INSTALLATION OF MULTI-PIN COMPONENTS ON CIRCUIT BOARDS

BACKGROUND OF THE INVENTION

The invention relates to a converter socket for connecting a multiple pin component to a plurality of sockets attached to a circuit board.

For a variety of reasons, manufacturers of electronic circuit boards use sockets as a means for connecting integrated circuits (ICs) to a circuit board. However, ICs are more commonly soldered directly to the printed circuit board (PCB). Each pin of the IC is inserted into a plated through hole in the PCB. Solder is then applied to electrically connect the pin to the walls of the plated through hole. Since the solder will provide an electrical connection even if the pin is thin relative to the hole diameter, manufacturers of ICs typically do not control the dimensions of the pins to a high degree of precision. Rather, to reduce costs, a manufacturing process is used which yields pins having dimensions which vary over a wide range (i.e., a coarse tolerance).

Accordingly, conventional circuit board sockets are designed to accommodate pins having a wide range of diameters (i.e., pins having a coarse tolerance). In order to accommodate pins of relatively narrow diameters, these sockets tend to engage the relatively wide pins with a degree of friction which far exceeds that required to yield the desired electrical contact. As a result, the aggregate frictional forces caused by the engagement of a large number of IC pins with their companion sockets can be sufficiently large to require the use of specialized tools to assist in extracting and inserting the IC.

SUMMARY OF THE INVENTION

In general, in one aspect, the invention features effectively reducing the wide variation in pin diameter (i.e., coarse tolerance) of a multi-pin component by introducing converter elements between the component and the board-mounted sockets. The converter elements accept the coarse tolerance pins of the component, and provide in their place precision tolerance pins (i.e., pins with a diameter tolerance less than the coarse tolerance of the component pins) for insertion into the board-mounted sockets.

Preferred embodiments include the following features. The receptors are sized and positioned on the body to engage pins having pin spacing and pin diameters each of which vary within coarse ranges. The precision pins are controlled such that the pin spacing and pin diameters are each within precision ranges, the variation within the precision ranges being less than the variation within the coarse ranges. For example, the precision variation of pin spacings is 0.004 inches or less, while the coarse variation is 0.01 inches or greater. Similarly, the precision variation of diameters is 0.001 inches or less while the course variation of diameters is 0.004 inches or greater.

Further the body includes an opening positioned beneath the component when the component is installed in the sockets. The opening is sufficiently large to accommodate a knockout of an extraction tool to engage the bottom of the multi-pin component to provide an extraction force between the body and the component.

In general, in another aspect, the invention features making connections between the pins of a multi-pin component and posts mounted on a circuit board. The invention includes converter elements having a first receptor for mating with a pin of the multiple pin component, and a second receptor for mating with a post on the circuit board.

In general, in another aspect, the invention features a contact stub having a curved end for making connection with the resilient fingers of a socket mounted on a circuit board. The length of the stub is sufficiently short so that when the stub is fully inserted, the fingers engage the curved end of the stub to provide a force with an upward component, i.e., a component parallel to the longitudinal axis of the stub, and in the direction resisting insertion of the stub.

The invention provides several advantages. For example, since the dimensions of the pins of the converter elements are precisely controlled, the force required to remove the precision pins from the board mounted sockets is substantially reduced. Accordingly, by mounting the multi-pin component to the board via the converter elements, the multi-pin component can be removed with reduced force, thereby lessening the mechanical strain on the body of the component. Further, in embodiments wherein the converter elements include contact stubs having curved ends, the force of removal may be reduced to zero.

Converter elements having a pair of receptors allow component pins to be connected to board mounted posts. This allows board mounted posts to be used in lieu of board mounted sockets. Since the posts cover less surface area of the board than the sockets, additional board area is freed for use in running conductive etches.

Other features and advantages of the invention will be apparent from the following description of the preferred embodiments and from the claims.

DESCRIPTION OF THE PREFERRED EMBODIMENTS

Figure 13A:
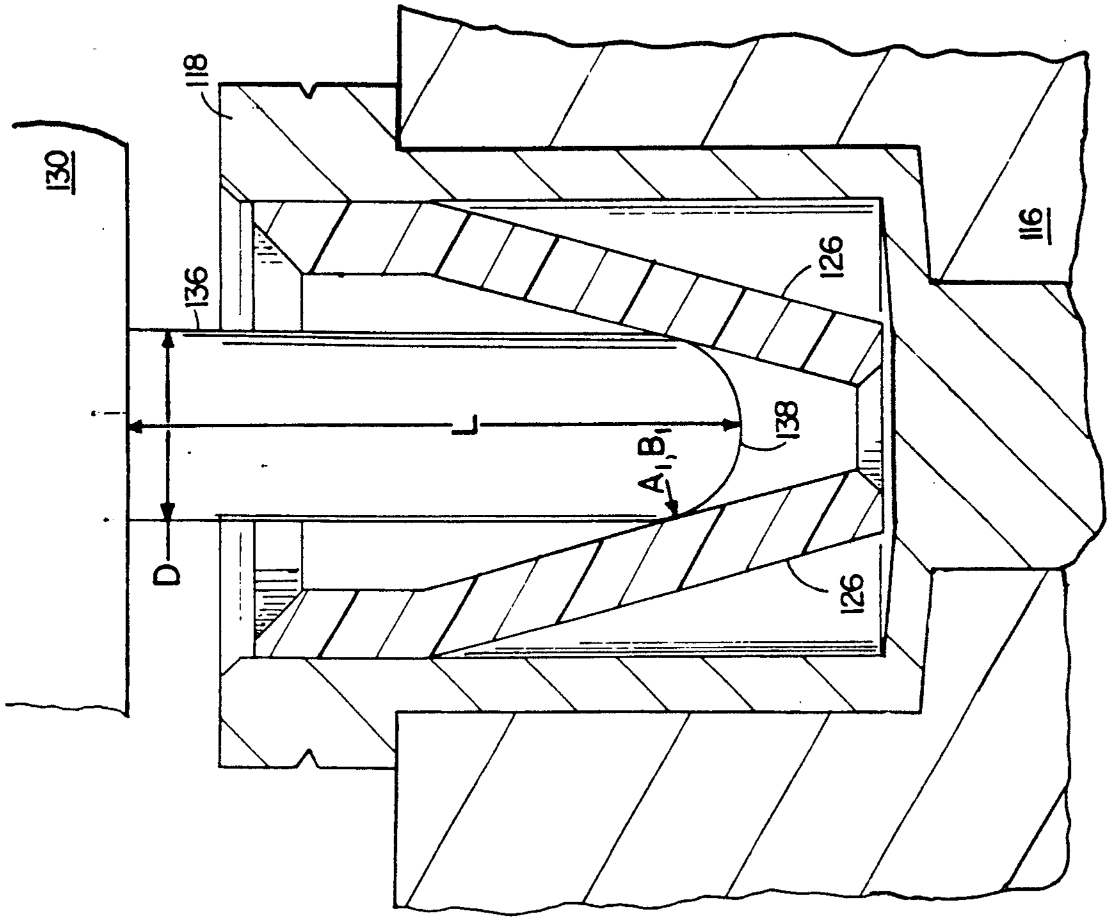
FIGS. 13 is a cross-sectional view of a segment of the embodiment shown in FIG. 12, with the converter socket partially installed in the circuit board sockets.
Figure 13:
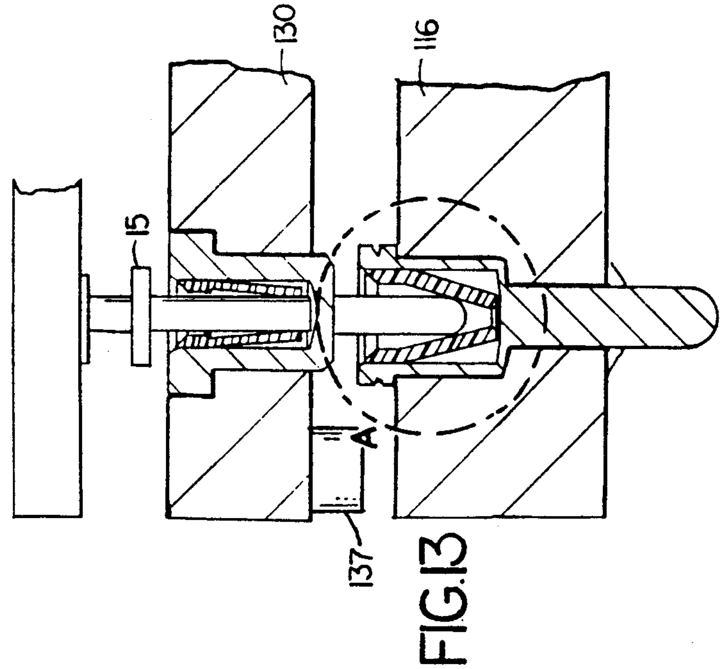

FIG. 13*a* is a more detailed view of region A of FIG. 13.

Figure 12:
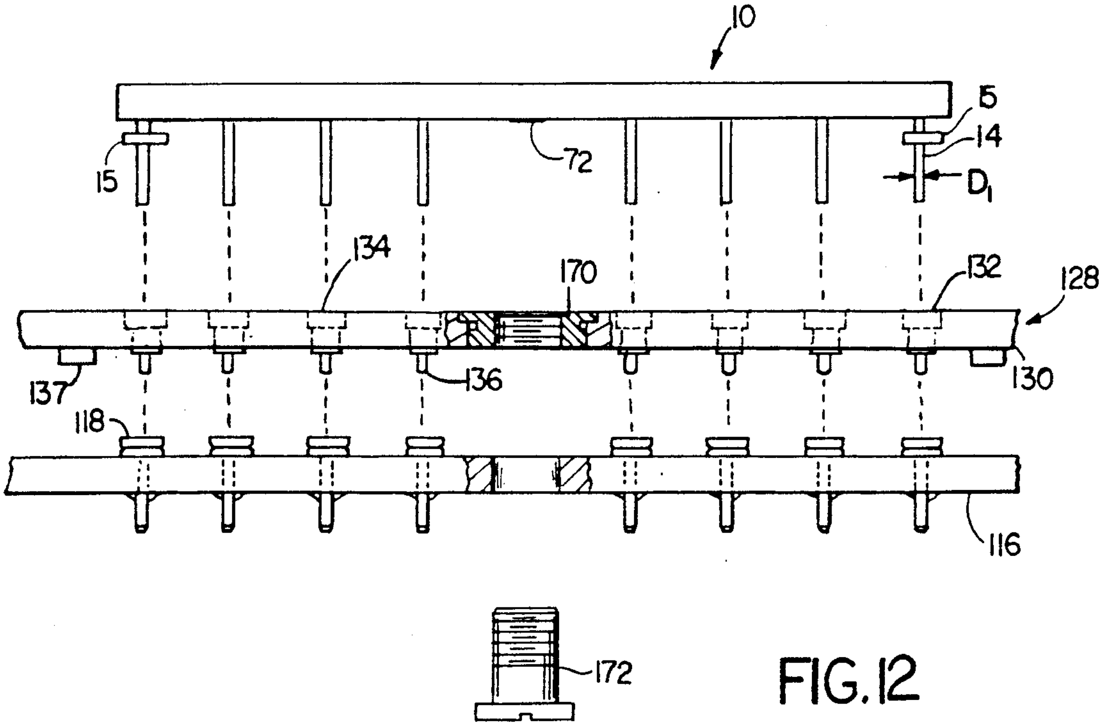
FIG. 12 is a cross-sectional view of another preferred embodiment.
Figure 14A:
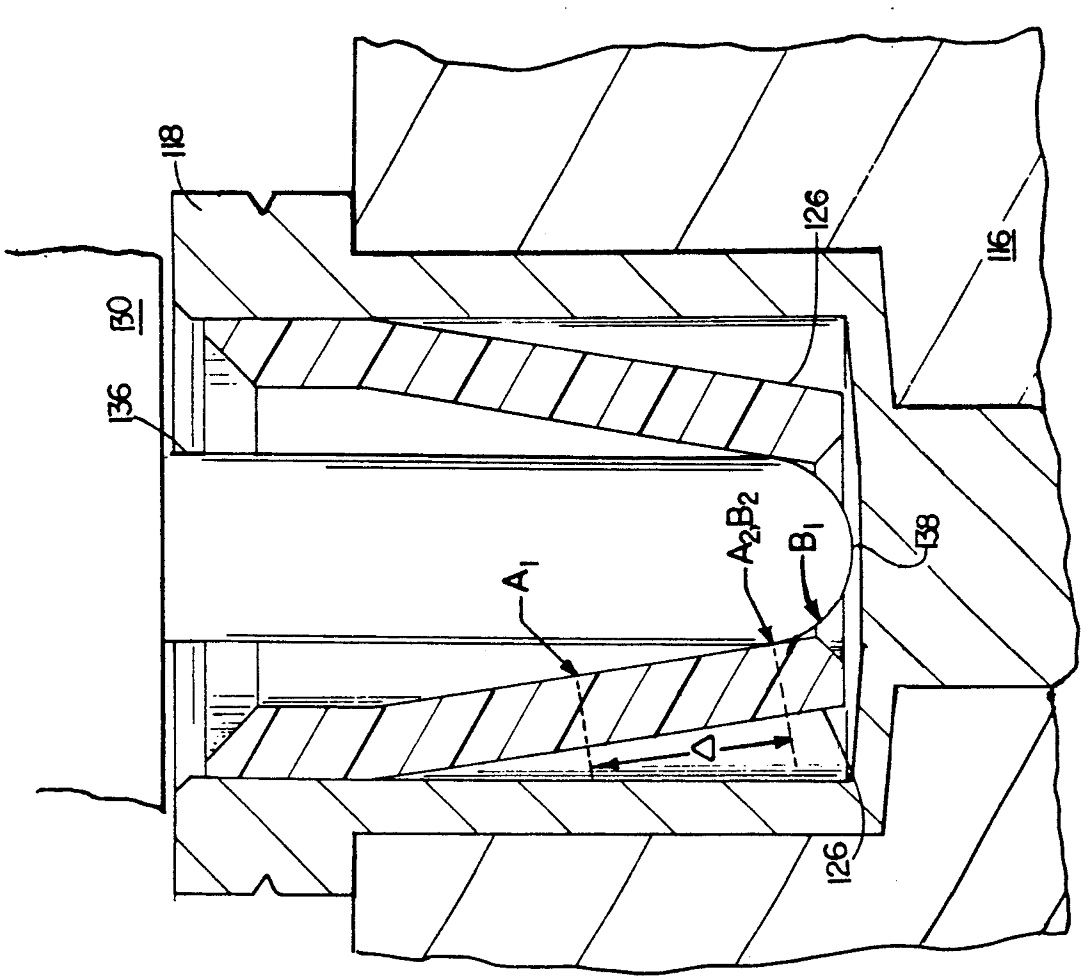
Figure 14:
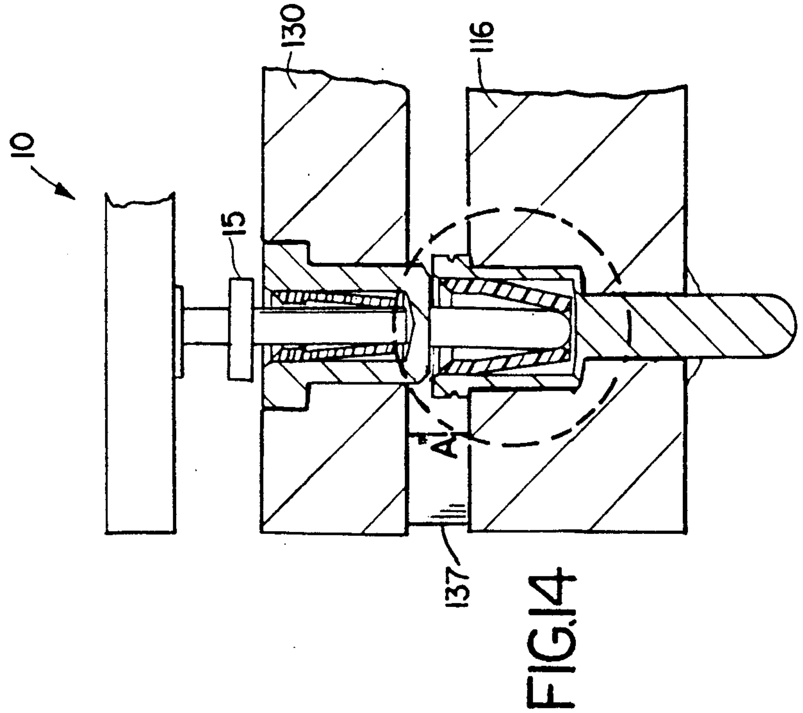

FIG. 14 is a cross-sectional view of a segment of the embodiment shown in FIG. 12, with the converter socket fully installed in the circuit board sockets.

FIG. 14a a more detailed view of region A of FIG. 14.

Figure 1:
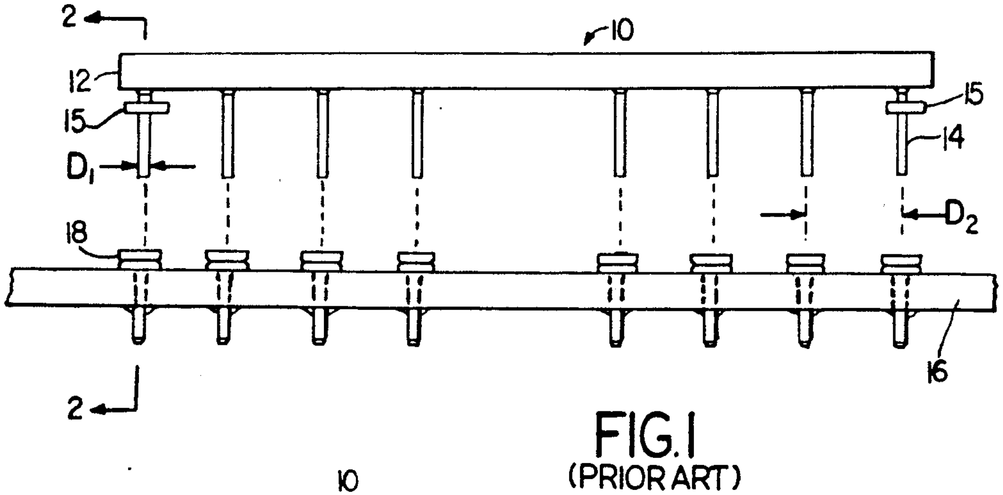
FIG.1 (PRIOR ART)
FIG. 1 is a side view of a prior art pin grid array in position to be installed in sockets of a printed circuit board.
Figure 2:
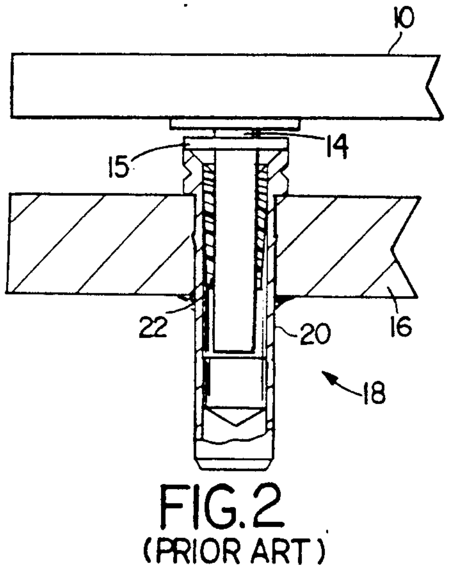
FIG.2 (PRIOR ART)
FIG. 2 is a cross-sectional view at 2—2 of FIG. 1.

A conventional socket installation of an IC in a circuit board is shown in FIGS. 1 and 2. An IC having a large number of pins is often packaged as a pin grid array (PGA) 10. PGA 10 includes a ceramic body 12 which supports a group of male contact pins 14. Typically, pins 14 are manufactured with diameters $D_1$ which vary over a relatively coarse range. For example, diameters may vary from 0.016 to 0.020 inches (i.e., a variation of 0.004 inches). Thus, the largest diameter pin (0.020 inches) can be 25 percent larger than the narrowest diameter (0.016 inches).

Similarly, the distance $D_2$ between pins (FIG. 2) may vary over a relatively coarse range. For example, adjacent pins are typically 0.1 inches apart but may vary from the typical separation distance by up to $\pm 0.005$ inches (i.e., a variation of 0.010 inches) from tip to tip.

Figure 3:
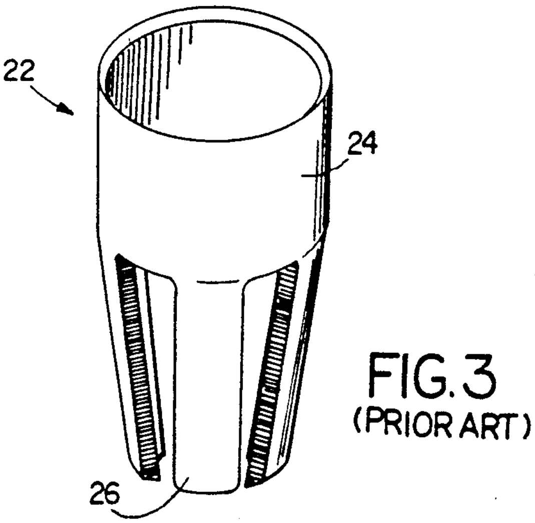
FIG.3 (PRIOR ART)
FIG. 3 is a perspective view of a prior art socket contact.

A PGA 10 is often mounted to a printed circuit board (PCB) 16 by inserting each pin 14 of the PGA into a corresponding socket 18 which is soldered into a plated through hole of the printed circuit board. The body 20 of the socket is soldered to the PCB. A contact 22 is pressed into the interior of the body. The contact frictionally engages the sides of each pin 14. As shown in FIG. 3, contact 22 includes a barrel 24 attached to a plurality of spring elements 26. Pin 14 passes through the barrel and frictionally engages spring elements 26 to form an electrical connection. Several pins 14 include standoffs 15 which engage the top of the socket when the PGA is fully inserted.

The spring elements are designed to engage pins having any diameter within the coarse range of PGA pin diameters. The largest pin diameter which the spring elements can accommodate is determined by the elastic limit of the spring elements. If a pin having a greater diameter is inserted into the socket, the spring elements will experience plastic deformation such that on removal of the pin, the spring elements will not return to their original position.

The smallest diameter which the spring elements can accommodate is determined by the minimum normal force between spring elements and pin required to achieve a reliable electrical contact. For example each spring element should engage the pin with at least 15 to 50 grams of normal force and preferably 25 grams.

To assure a reliable connection, spring elements 26 must be designed to provide sufficient frictional engagement with even the narrowest possible pin 14 (i.e. 0.016 inch diameter). Accordingly, most socket designs an even greater frictional engagement with larger pins.

The frictional engagement between a pin and its socket may be yet further increased if the pin and an adjacent pin are further apart or closer together than their companion sockets. Such a disparity, which results in part from the coarse range of PGA pin spacing, may force each pin against one side of its companion socket, thereby substantially increasing the frictional engagement.

As explained in J.B. Cullinane, "Pin Grid Array Socket Total Forces", 22nd Annual Connector & Interconnection Technology Symposium (1989) (incorporated herein by reference) other variables which contribute to the total insertion/extraction forces include: pin length, end of pin geometry, cumulative pin to pin tolerance, pin true positioning pin perpendicularity, pin material and pin plating composition.

Figure 4:
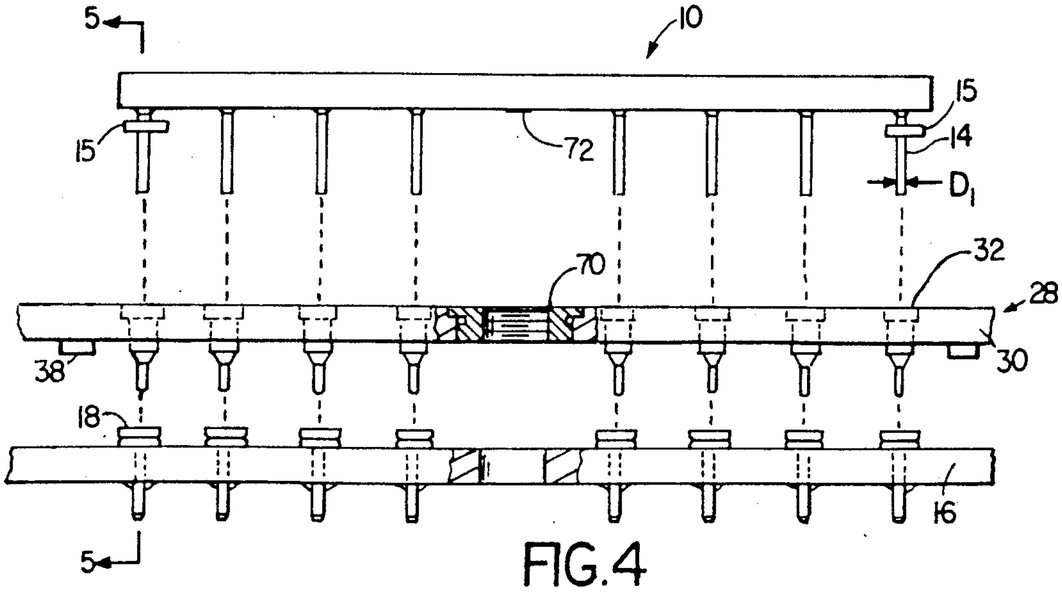
FIG. 4 is a side view of a preferred embodiment of the invention.
Figure 5:
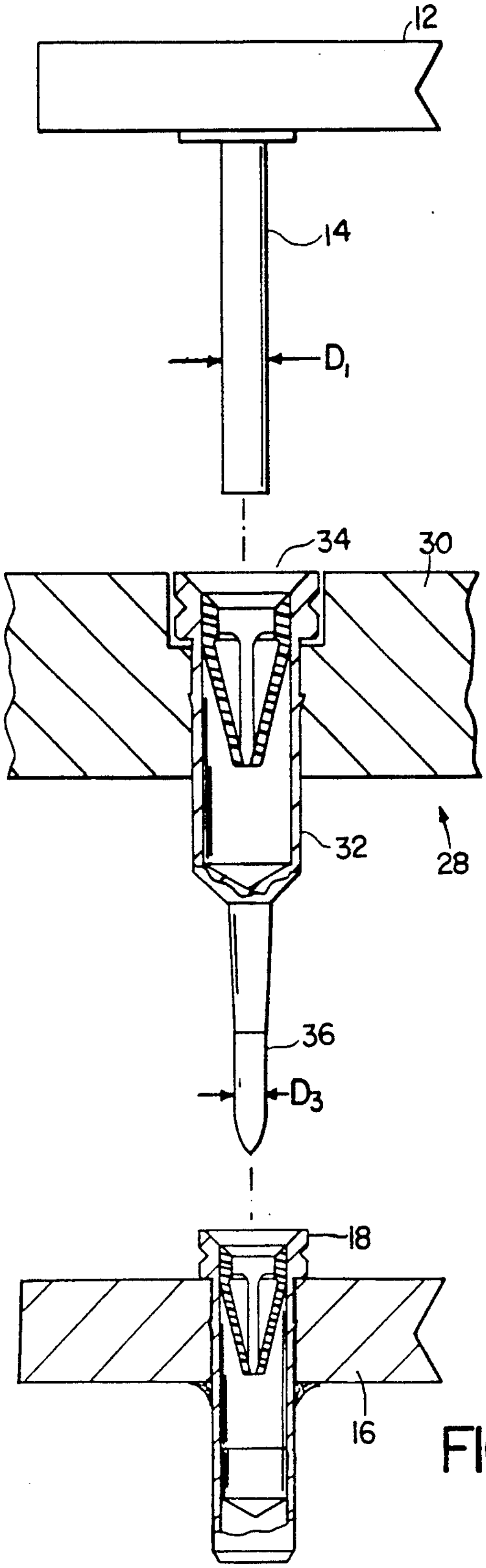
FIG. 5 is a cross-sectional view at 5—5 of FIG. 4.
Figure 6:
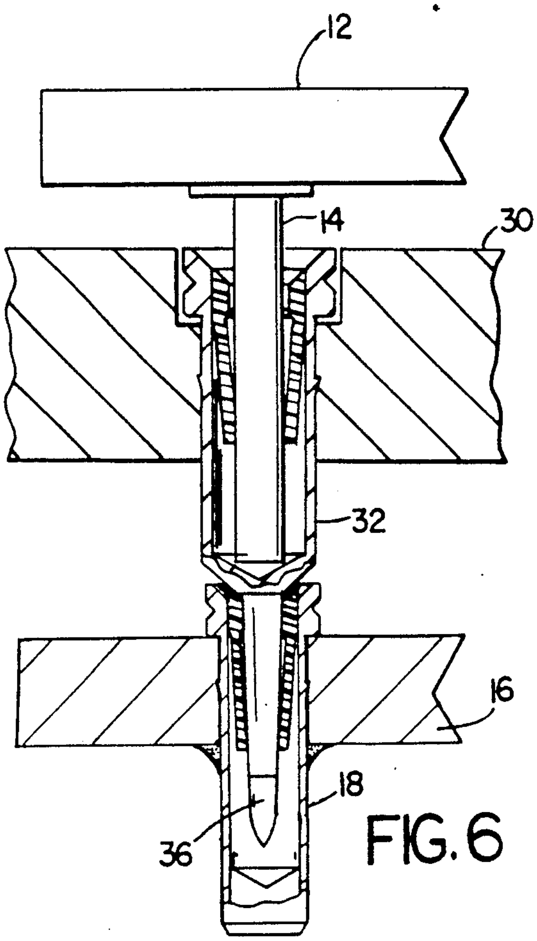
FIG. 6 is a cross-sectional view along the same section as FIG. 5 showing the parts assembled.

A preferred embodiment of the invention is shown in FIGS. 4–6. A converter socket 28 having a body 30 holds a plurality of converter elements 32, arranged in the same footprint as PGA 10. Each converter element 32 includes a female socket 34 for mating with a corresponding PGA pin 14, and a high precision pin 36 for mating with PCB socket 18. The dimensions and relative locations of pins 36 are tightly controlled to eliminate the increased frictional engagement forces described above. For example, the distance between adjacent pins is controlled to within 0.002 inches of the typical distance, 0.1 inches. Further, each pin diameter $D_3$ is controlled to within $\pm 0.0005$ inches of the typical diameter, 0.0165 inches (i.e., a variation of 0.001 inches).

When used with conventional sockets 18, the pins 36 can be designed with a diameter corresponding to the narrowest diameter which the socket can accommodate, thereby minimizing the frictional engagement.

Figure 9:
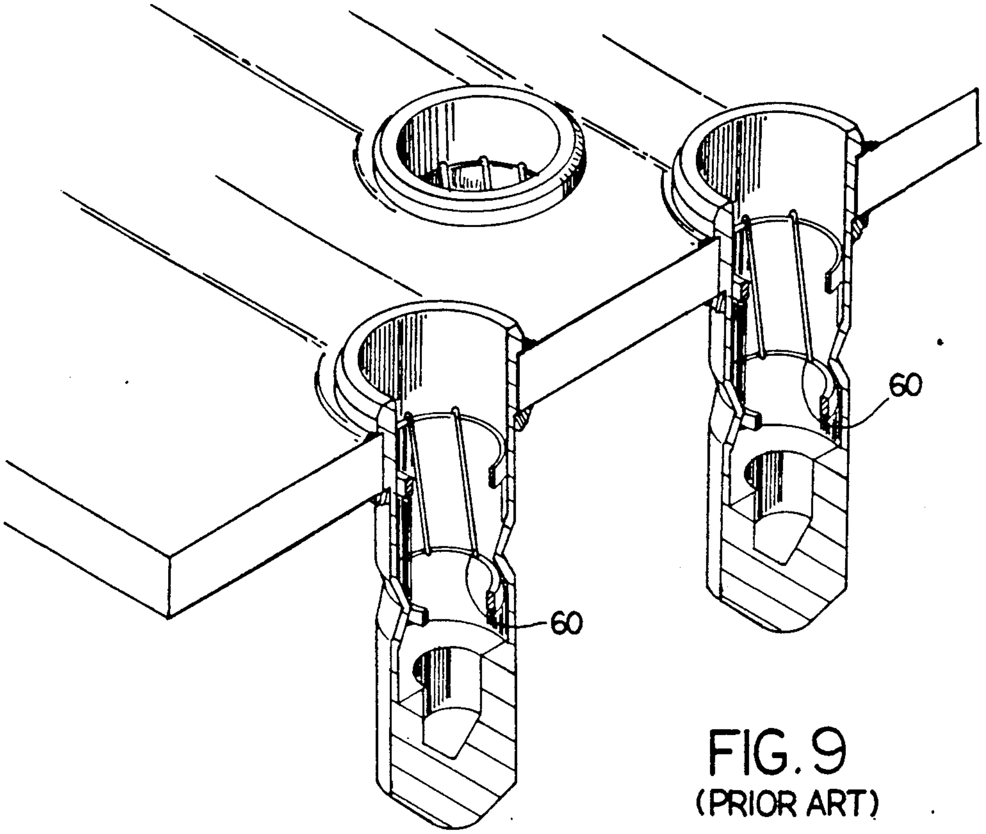
FIG. 9 (PRIOR ART)
FIGS. 9–10 are perspective views of a prior art socket sleeve.
Figure 10:
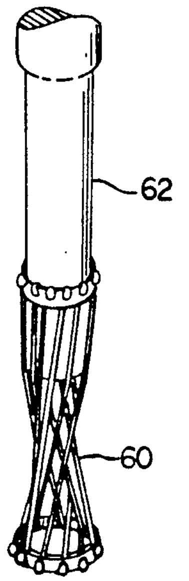
FIG. 10 (PRIOR ART)

This invention also makes possible the use of nonconventional printed circuit board sockets specifically designed to take advantage of the precision of pins 36, to reduce the force of frictional engagement. For example, FIGS. 9 and 10 depict a prior art socket sleeve 60 for mating with precision pin 62. Socket sleeve 60 provides an electrical contact with pin 62 with little frictional engagement. However, to use this type of sleeve, the inserted pin 62 must be manufactured with a relatively high degree of precision. For example, sleeves 60 designed to accommodate pins 62 having a diameter of 0.018 inches, typically require that the pin be within 0.0004 inches of that diameter.

Figure 11:
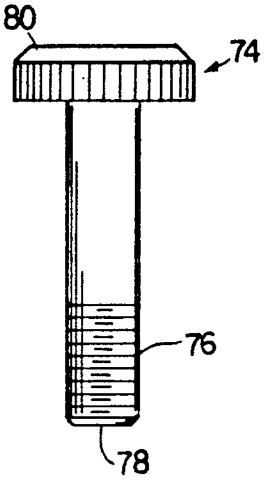
FIG. 11 is a cross-sectional view of an extraction jack screw.

While the use of precision pins 36 reduces the frictional engagement with sockets 18, the frictional engagement between the PGA pins 14 and female sockets 34 may remain sufficiently great (in cases where a great many pins extend from the PGA) to require the assistance of an extraction tool to separate the PGA from the converter socket. Toward this end, a threaded pem nut 70 may be pressed into an opening in the center of the body 30 of the converter socket. Many PGAs, as shown in FIG. 4, include a desert region 72 near the center of the body of the PGA having no pins. Accordingly, to separate PGA 10 from converter socket 28, a threaded jack screw 74 (FIG. 11) may be employed. Jack screw 74 includes a threaded post 76 for mating with pem nut 70. As the jack screw is threaded into the pem nut, the end 78 of the threaded post serves as a knockout means, by engaging the bottom of the PGA to separate the PGA from the converter socket. To provide leverage, the jack screw includes a gripping knob 80 having a diameter greater than that of the threaded post.

Figure 7:
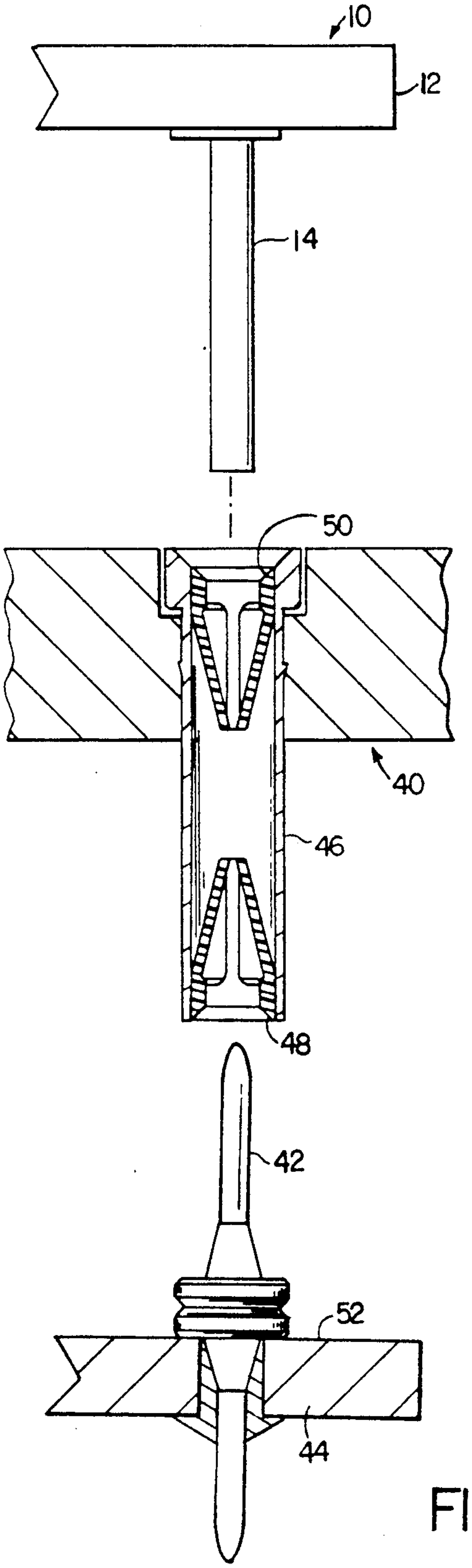
FIGS. 7–8 are cross-sectional side views, showing another preferred embodiment.
Figure 8:
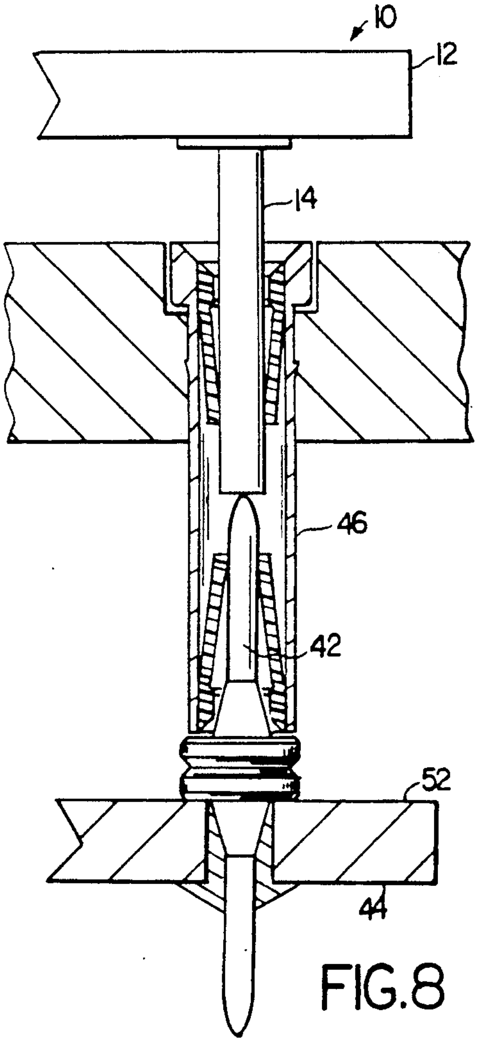

Another preferred embodiment is shown in FIGS. 7–8. A converter socket 40 provides a connection between the pins of PGA 10 and posts 42 mounted on printed circuit board 44. In this embodiment, the converter element 46 includes a pair of female sockets 48,50 for mating with post 42 and pin 14 respectfully.

The ability to install a PGA using board mounted posts instead of sockets can facilitate the use of conductive etches during manufacturing. Posts 42 typically have smaller diameters than sockets 18 and accordingly cover less area of the top surface 52 of PCB 44. Even with 0.1 inch spacing between posts as required for conventional PGAs, sufficient space is available to allow conductive etches to run between adjacent posts 42. Sockets, with their wider profiles, often operate as a virtual wall to the running of etch, thereby complicating layouts of the printed circuit board.

To achieve reduced friction, PCB posts 42 and female sockets 48 are manufactured and positioned with the same precision as posts 36 (FIG. 5). Accordingly, converter-socket 40 provides the dual advantage of expanding the amount of PCB surface available for running etches and facilitating insertion and extraction of the PGA.

In another preferred embodiment shown in FIGS. 12–14, extraction forces are reduced practically to zero. In this embodiment, each converter element 132 of converter socket 128 includes a female socket 134, identical to socket 34 (FIG. 4) described above, for mating with a corresponding PGA pin. However, for mating with PCB socket 118, converter element 132 includes a short contact stub 136 having a curved end 138.

The contact stub engages with fingers, or spring elements, 126 of socket 118 to form the desired electrical connection. The dimensions of the contact stub are chosen to prevent the fingers, or spring elements, from gripping the stub in a manner which resists removal. During insertion, region $B_1$ of the contact stub first contacts each spring element in a region $A_1$. With further insertion, the contact stub wipes across the surface of the spring element, pushing the elements apart. When fully inserted, stop 137 rests on the surface of PCB 116 and region $B_2$ of the stub is pressed against region $A_2$ of each spring element. The dimensions of the stub, the spring elements, and the stop are chosen such that $B_2$ lies on the curved surface of the stub, and such that the distance $\Delta$ between $A_1$ and $A_2$ is sufficiently large that adequate wiping action occurs to remove oxide build up on the contact regions (i.e. $\Delta = 0.010$ -0.015).

The contour of the curved surface is chosen to ensure that, even in the fully installed position, spring elements 126 push on the stub with a force having a vertically directed component. The aggregate of the vertical forces on the stubs is sufficient to eject the converter socket/PGA assembly unless a counterbalancing force holds the assembly in place. Toward this end, a pull down screw 172 is employed to mate with pem nut 170 to pull the converter socket/PGA assembly into the fully inserted position and hold it in place. In this embodiment, the pem nut serves dual purposes. When used with pull down screw 172, it assists in maintaining contact between the stubs 132 and spring elements 126. When used with jack screw 74 (FIG. 11) it assists in separating the PGA from the converter socket.

Other embodiments are within the following claims. For example, the invention can be applied to a variety of different board-mounted sockets, including sockets consisting solely of contacts pressed into holes in the circuit board. The connection technique of FIGS. 12–14 could be applied to the direct connection of a PGA to the circuit board if the preferred contact stubs 136 were provided on the PGA.

What is claimed is:

1. Apparatus for making connections between the pins of a multi-pin component and a circuit board, said apparatus comprising:

a plurality of conventional sockets with pins configured to be soldered to said circuit board;

a converter socket with individual converter elements each configured to be connected between a pin of said multiple pin component and one of said conventional sockets, said converter socket comprising:

a body; and a plurality of said converter elements supported on said body, each said converter element comprising:

a receptor for mating with a pin or said multiple pin component, said receptor being sized to engage a pin having any diameter within a coarse range of diameters, a precision pin for mating with one of said sockets on said circuit board, the diameter of said precision pin being held to a tolerance so that said diameter is within a precision range of diameters and wherein a variation in diameter within said precision range of diameters is less than the variation within said coarse range of diameters.

2. The apparatus of claim 1 further comprising:

an opening in said body, said opening being positioned beneath said component when said component is installed on said apparatus, the opening being sufficiently large to accommodate a knockout means of an extraction tool, and means for engaging said tool with said body and said tool with the bottom of the multi-pin component to permit an extraction force to be developed between said body and said component.

3. The apparatus of claim 1 wherein the diameters of all of said precision pins of said apparatus fall within said precision range of diameters.

4. A method of manufacturing apparatus for making connections between the pins of a multi-pin component and sockets mounted on a circuit board, said apparatus comprising a body and a plurality of converter elements supported on said body, each said converter element comprising a receptor for mating with a pin of said multiple pin component and a precision pin for mating with a socket in said circuit board, said receptor being sized to engage a pin having any diameter within a coarse range of diameters, said method comprising manufacturing said precision pins to a tolerance less than the variation in diameter within said coarse range.

5. A method of installing a multi-pin component into sockets mounted on a circuit board, wherein the diameters of the pins vary so widely in diameter (i.e., have a tolerance so large) as to make the insertion or extraction force required to install or remove said component undesirably large, said method comprising the steps of:

installing between said component and sockets a plurality of converter elements, one for each pin of said component, providing on each converter element a receptor capable of accepting said pins with widely varying diameters, and providing a precision diameter pin on the other end of each converter element, said pin having a diameter held to a smaller tolerance than the tolerance of the pins of said component.

6. A method of installing a multi-pin component into sockets mounted on a circuit board, wherein the pins extending from the component vary widely in diameter (i.e., have a coarse tolerance), said method comprising the steps of:

installing between said component and board-mounted sockets a plurality of converter elements, each converter element having a receptor capable of accepting pins having a coarse tolerance, and each converter element having a pin with a diameter capable of being received in said mounted sockets and held to a precision tolerance, i.e., tolerance less than said coarse tolerance.

7. The invention of claim 1, 4, 5, or 6 wherein said receptors are sized and positioned to engage pins having any pin spacing within a coarse range of pin spacing, said precision pins are sized and positioned to have a pin spacing within a precision range of pin spacing, and the variation in spacing within said precision range of pin spacing is less than the variation within said coarse range of pin spacing.

8. The invention of claim 7 wherein said variation in pin spacing within said precision range is 0.002 inches or less.

9. The invention of claim 8 wherein said variation in pin spacings within said coarse range is 0.010 inches or greater.

10. The invention of claim 1, 4, 5, or 6 wherein said precision range of diameters is 0.001 inches or less.

11. The invention of claim 10 wherein the variation in diameter within said coarse range of diameters is 0.004 inches or greater.

12. Apparatus for making connections between the pins of a multi-pin component and posts mounted on a circuit board, said apparatus comprising:

a body;

a plurality of converter elements supported on said body, each said converter element comprising a first receptor for mating with a pin of said multiple pin component, said first receptor being sized to engage a pin having any diameter within a coarse range of diameters, a second receptor for mating with one of the posts on said circuit board, the posts having diameters held to within a precision range of diameters, and wherein the variation in diameter within said precision range of diameters is less than the variation within said coarse range of diameters.

13. The apparatus of claim 12 further comprising:

an opening in said body, said opening being positioned beneath said component when said component is installed on said apparatus, the opening being sufficiently large to accommodate a knockout means of an extraction tool, and means for engaging said tool with said body and said tool with the bottom of the multi-pin component to permit an extraction force to be developed between said body and said component.

14. A method of making connections between the pins of a multi-pin component and a circuit board, wherein the pins extending from the component vary widely in diameter (i.e., have a coarse tolerance), said method comprising the steps of:

installing between said component and board-mounted posts a plurality of converter elements, each converter element having a first receptor capable of accepting said pins, said first receptor being sized to engage a pin having any diameter within a coarse range of diameters, and each converter element having a second receptor capable of accepting one of the posts, the posts having diameters held to within a precision range of diameters, and wherein the variation in diameter within said precision range of diameters is less than the variation within said coarse range of diameters.

15. Apparatus for making connections to sockets mounted on a circuit board, said sockets being of the type having a contact with resilient fingers, wherein said apparatus includes a contact stub provided on said apparatus for making each of a plurality of said connections, said stub having a curved end and said stub being of sufficiently short length so that during said insertion of said stub into a said socket, said curved end engages at least one said finger and produces a wiping action of said finger against said curved end with the location of contact between said fingers and stub remaining on said curved end so that a force with an upward component, i.e., a component parallel to the longitudinal axis of said stub, and in the direction resisting insertion of said stub, is maintained in the fully inserted position.

16. The apparatus of claim 15, further comprising a body and a plurality of converter elements, said elements comprising receptors at one end for mating with the pins of a multi-pin component and said stubs at the other end for mating with said sockets.

17. The apparatus of claim 15 wherein said wiping action occurs across a distance of at least 0.010 inches.

18. The apparatus of claim 16 further comprising:

an opening in said body, said opening being positioned beneath said multi-pin component when said multi-pin component is installed on said apparatus, the opening being sufficiently large to accommodate a knockout means of an extraction tool, and means for engaging said tool with said body and said tool with the bottom of the multi-pin component to permit an extraction force to be developed between said body and said component.

* * * * *

UNITED STATES PATENT AND TRADEMARK OFFICE
CERTIFICATE OF CORRECTION

PATENT NO. : 5,038,467

DATED : August 13, 1991

INVENTOR(S) : James V. Murphy

It is certified that error appears in the above-identified patent and that said Letters Patent is hereby corrected as shown below:

Title Page:

In section [56] References Cited, under U.S. PATENT DOCUMENTS:

"3,900,269" should be --3,900,239--.

"4,675,007" should be --4,674,007--.

Column 3, line 1, between "Fig. 14a" and "a", insert --is--.

Signed and Sealed this

Twentieth Day of October, 1992

Attest:

DOUGLAS B. COMER

*Attesting Officer*

*Acting Commissioner of Patents and Trademarks*